UNITED STATES PATENT OFFICE 1,999,261

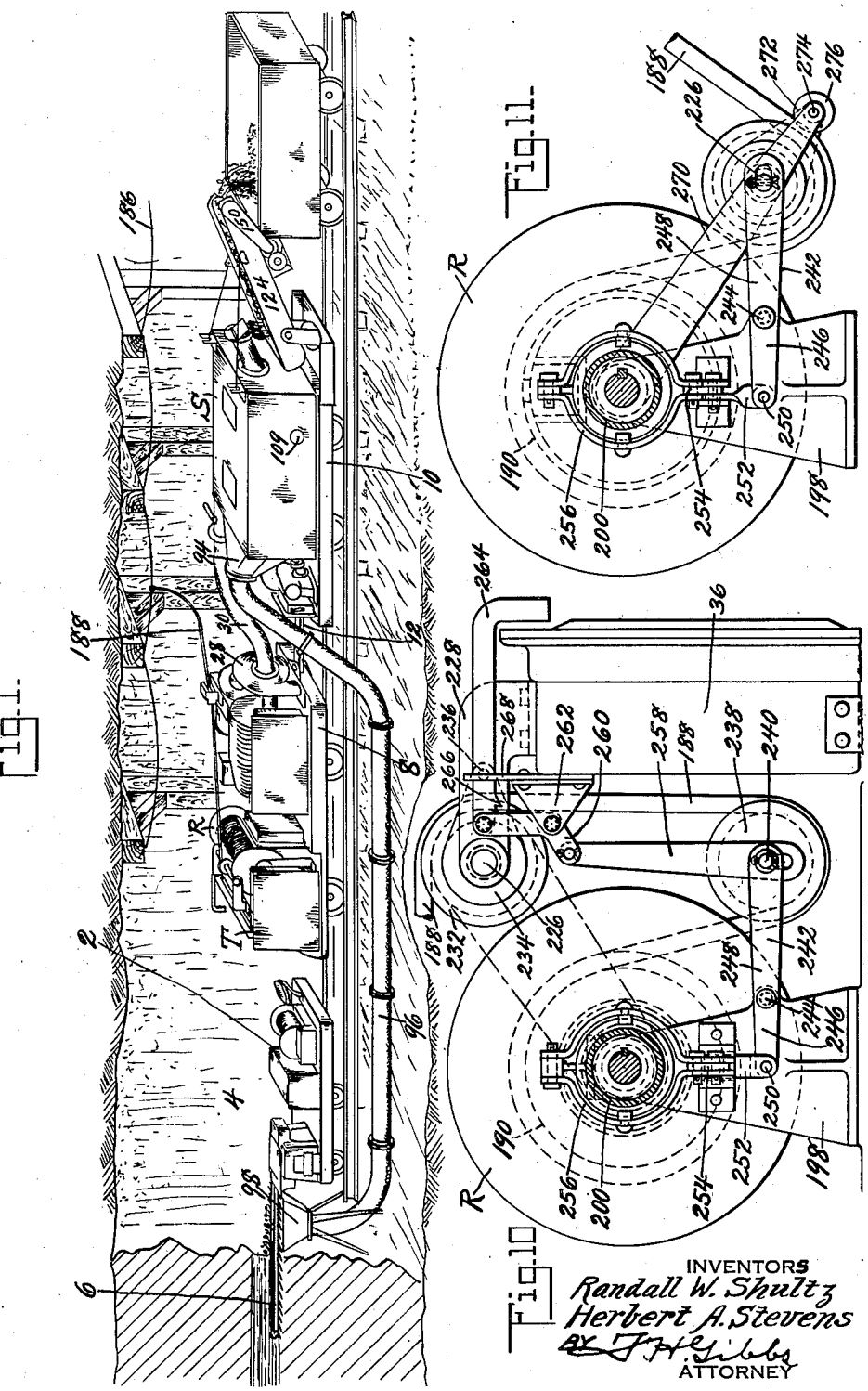

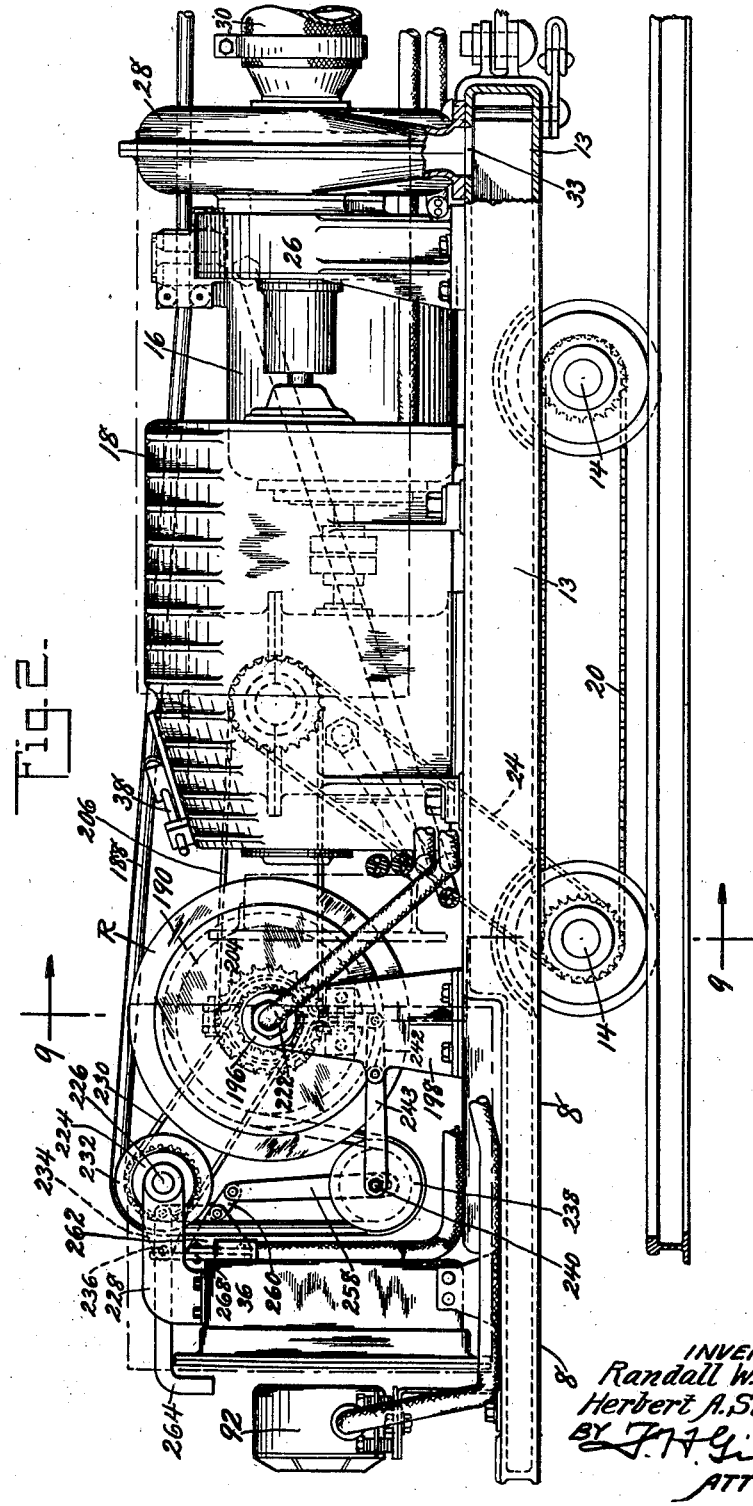

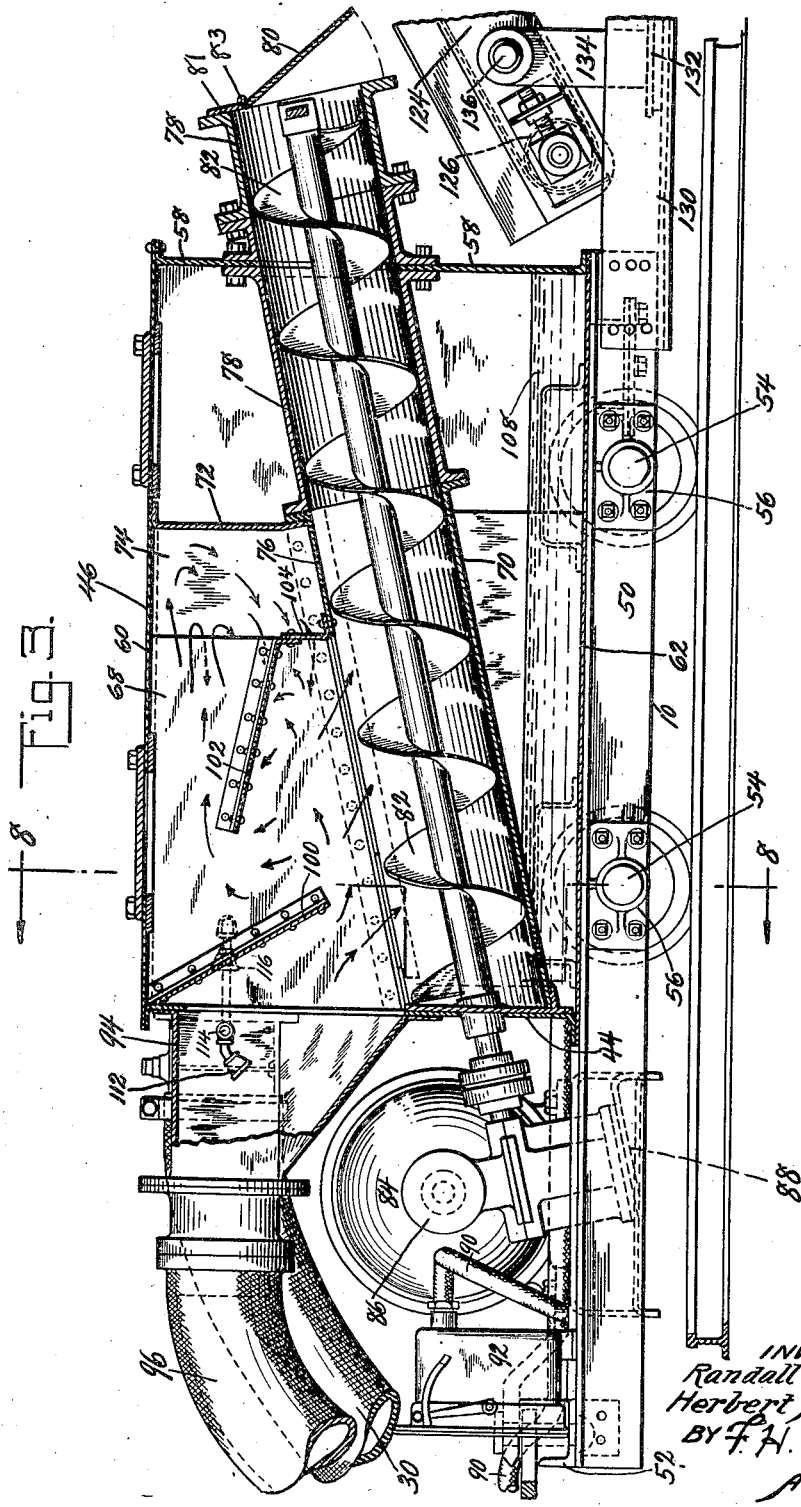

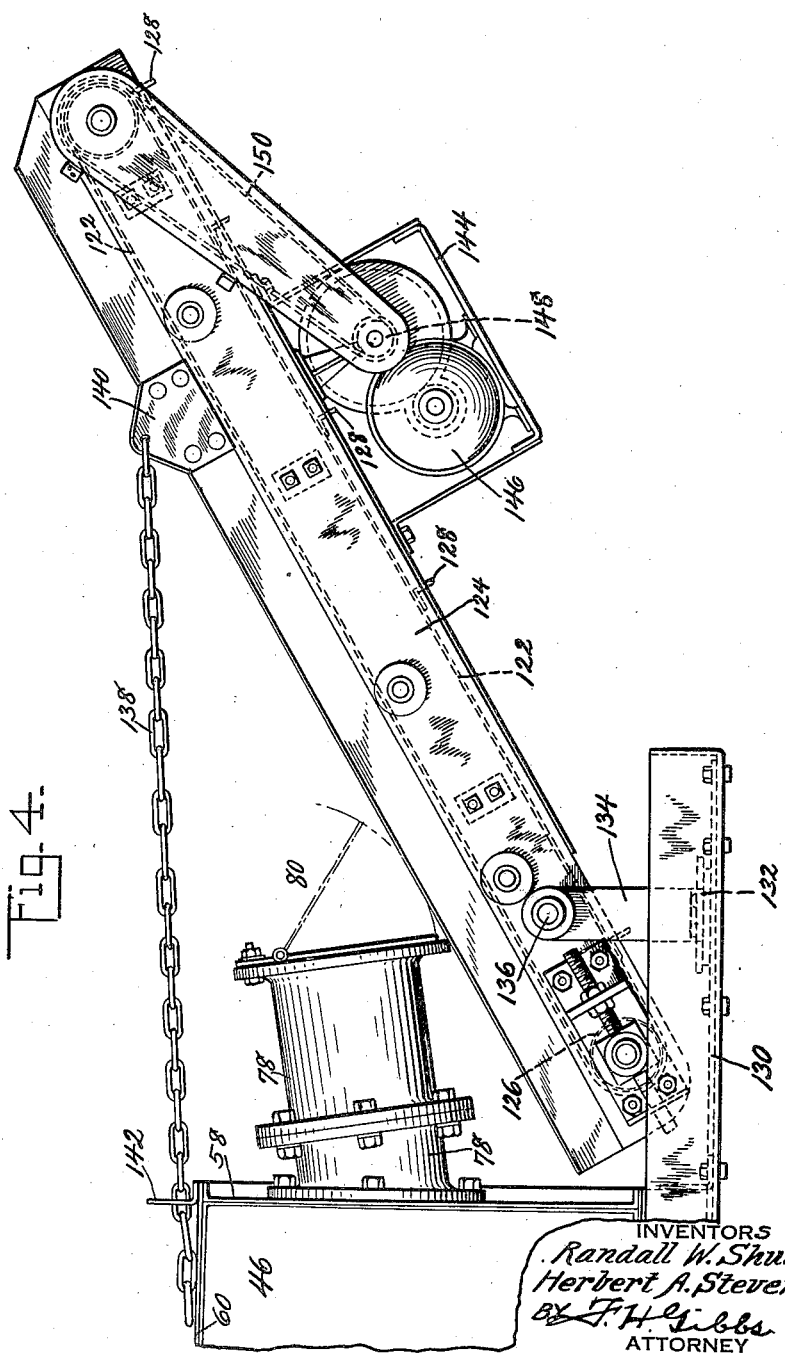

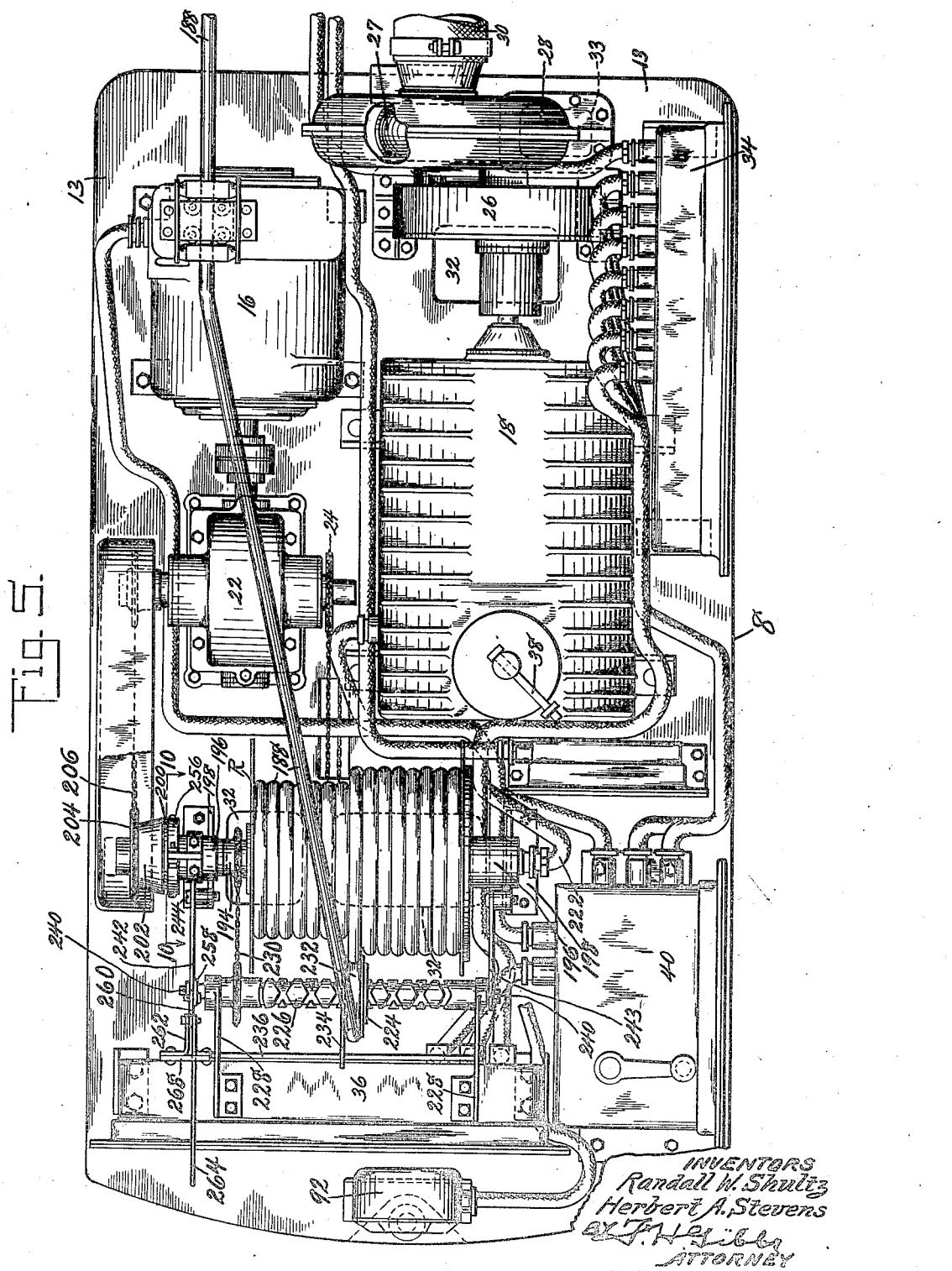

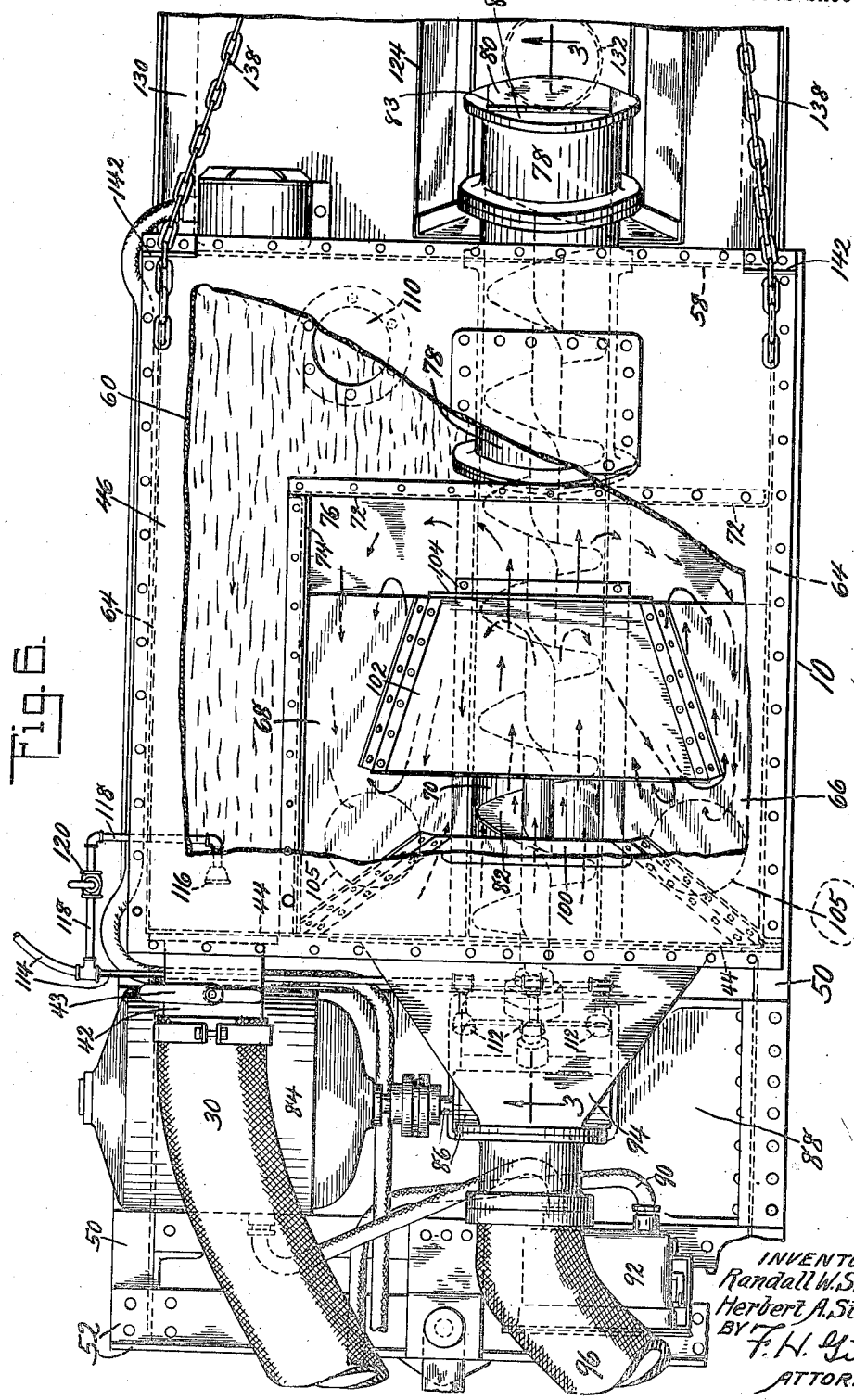

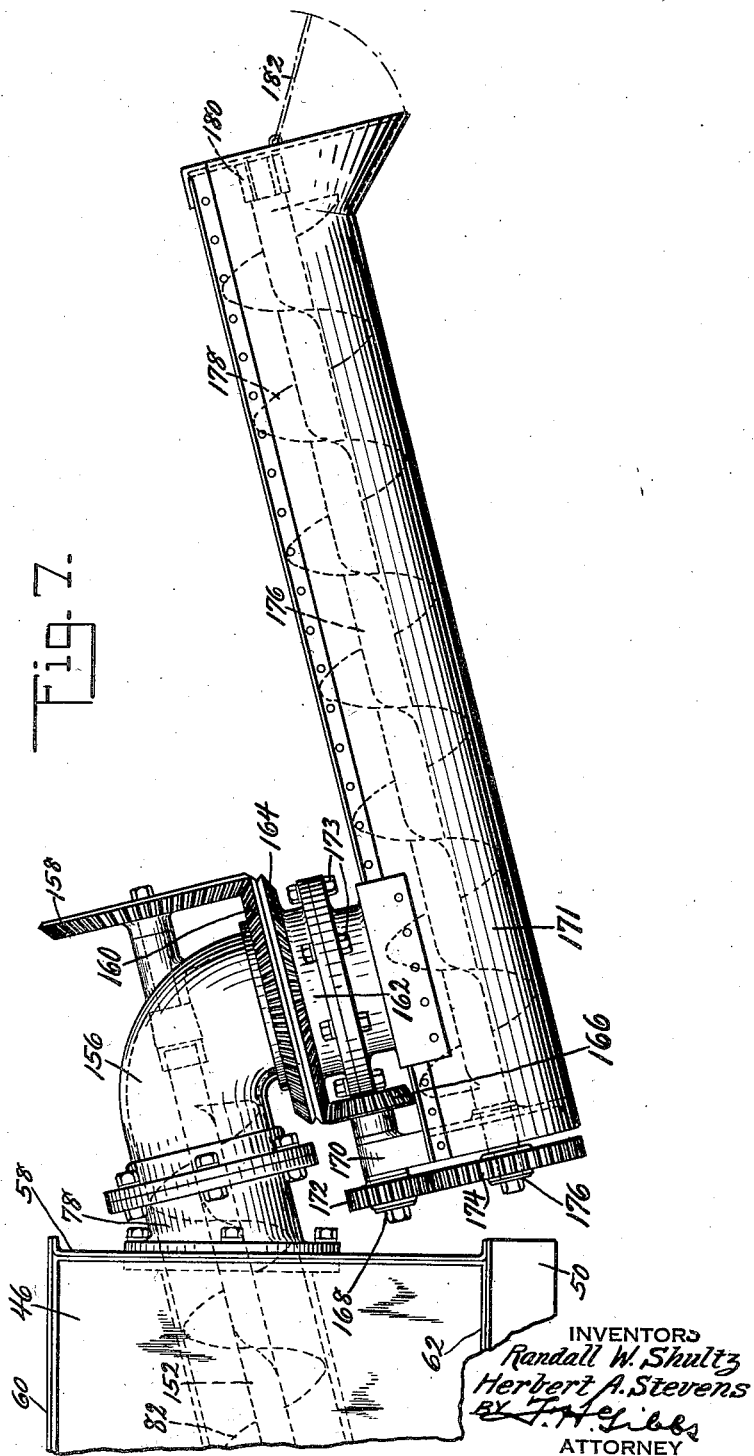

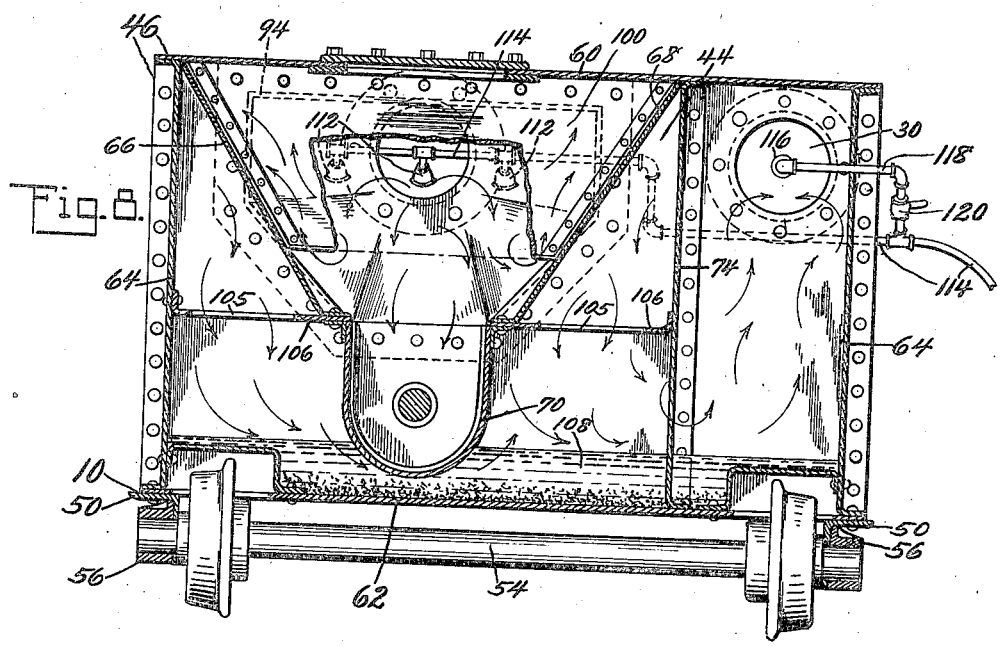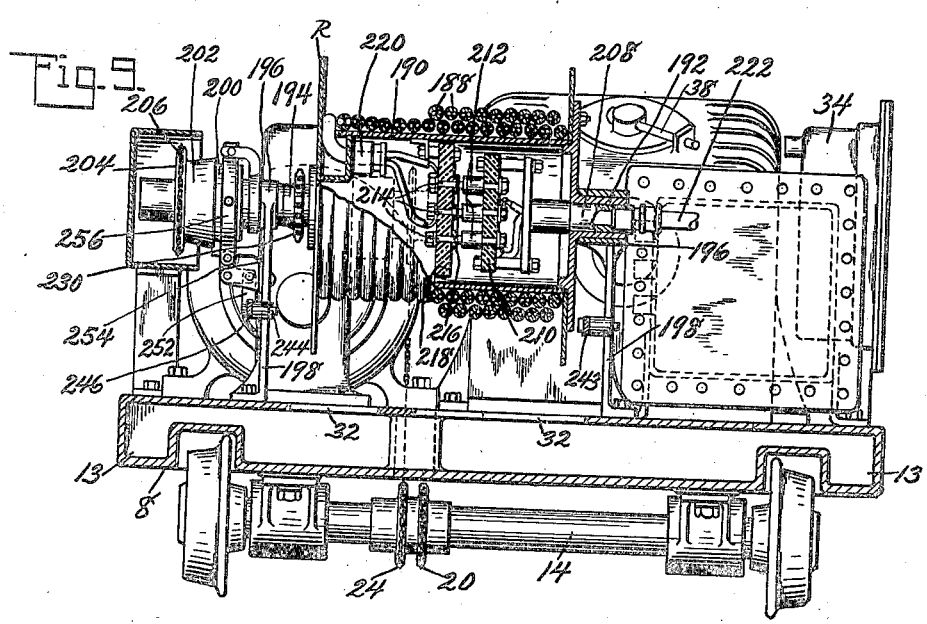

MACHINE FOR HANDLING MINE CUTTINGS

Randall W. Shultz and Herbert A. Stevens, Berwick, Pa., assignors to American Car and Foundry Company, New York, N. Y., a corporation of New Jersey Application June 22, 1932, Serial No. 618,631

4 Claims. (Cl. 209—142)

This invention relates generally to mining machinery and has particular reference to a machine for handling cuttings resulting from the operation of a cutting machine in the working surface of a working chamber of a mine.

One object of this invention is the provision of new and improved means for eliminating the danger of dust being suspended in the air or distributed throughout the mine.

Another object of this invention is the provision of a mine refuse machine adapted for operation in conjunction with a cutting machine to remove the cuttings as they develop and to convey them to a place where they are to be gobbed; the machine including means for trapping and retaining the more finely divided cuts and waste such as dust.

Still another object of this invention is the provision of a machine of the character described which is adapted to cooperate with a cutting machine or the cutter bar thereof to remove coal or the like from the working surface of the mine and to load the coal into a mine car by which it may be removed from the working chamber; the machine having provision for trapping and retaining therein finer particles and waste, such as coal dust, to prevent danger of dust being suspended in the air or being scattered throughout the mine.

A further object of this invention is the provision of a machine of the character described operating by suction to remove cuttings from the working surface of a mine to a separator forming a part of the machine from where the heavier particles are deposited at a desired point should such particles be waste material or into a mine car should the particles be coal or other material having a sales value; the separator having provision for trapping and retaining the finely divided waste materials such as dust.

At the present time, to prevent suspension of dust in the air of a mine, particuarly a coal mine, it is usual to direct a spray or jet of water under pressure against the cutter bar of a cutting machine where it necessarily flows or passes into the cut, but such practice not only renders the cuttings more difficult to handle but results in a collection of water on the floor of the working chamber of the mine. Further, the use of water in a manner such as just described is disadvantageous in that it operates to slow the cutting action of the knives and necessitates frequent replacement or sharpening thereof. With the above disadvantages in mind, the present device aims to and does eliminate the same and functions to handle the cuts or waste material in a dry state and the dust and cuttings are removed from the cut as they are formed.

A still further object of the present invention is the provision of a new and improved method of handling cuts in a mine whereby to prevent the suspension of dust in the air of the working chamber of a mine and to prevent the dust being scattered throughout said chamber and to provide a means for depositing the heavier waste materials at any desired point.

This invention further contemplates the provision of a new and improved traction unit for mine refuse machines.

As a further object, the present invention contemplates the provision of a new and improved cable reel for mining machinery.

This invention further comprises a new and improved method for removing and collecting refuse from the working chambers of mines.

A still further object of this invention is the provision of a new and improved method for removing cuttings from the working chambers of mines, said method including the collection and retention of those cuttings having little or no sales value and the depositing of marketable cuttings to a car or to a suitable place of deposit.

Other objects and advantages of this invention will be apparent from the following description taken in conjunction with the accompanying drawings in which:

Figure 1 is a view in perspective showing the machine of the present invention in use in a mine.

Fig. 2 is a side elevation, partly in section, of the traction unit of the machine of the present invention, certain parts of the unit being omitted in order to more clearly disclose other parts.

Fig. 3 is a view partly in side elevation and partly in section of a portion of the separator unit of the machine of the present invention, the sectional portion of the figure being taken on the line 3—3, Fig. 6.

Fig. 4 is a side elevational view of the rear end portion of the separator unit.

Fig. 5 is a top plan view of the traction unit, certain parts being shown broken away.

Fig. 6 is a top plan view of the separator unit shown in Fig. 3, certain parts being shown in section and other parts being broken away.

Fig. 7 is a view in side elevation of the rear end portion of the separator unit, showing a modified form of the invention.

Fig. 8 is a sectional view taken on the line 8—8, Fig. 3.

Fig. 9 is a sectional view taken on the line 9—9, Fig. 2.

Fig. 10 is a side elevation of the cable reel, certain parts thereof being shown in section, the section being taken on the line 10—10, Fig. 5, and Fig. 11 is a side elevation of a modified form of cable reel, certain parts being shown in section.

Referring more particularly to the drawings in which similar characters of reference designate similar parts in the several views, the machine of the present invention, in use, is arranged in back of a cutting machine at some point where it is desired to gob the waste material. This arrangement is indicated in Fig. 1, where the machine is arranged closely adjacent the cutter machine indicated generally at 2 in the working chamber 4 of a mine; the cutting machine being of conventional form and being provided with a cutter bar 6.

The machine of the present invention while adapted particularly for handling refuse cuttings is also adapted to handle material having a sales value such as coal, and it is to be understood that in the description to follow the term "refuse machine" is not to be interpreted as limiting the machine to the handling of materials having no sales value such as refuse cuttings or other waste material. The machine of the present invention, while it comprises a single operative device is, of necessity, mounted on two trucks indicated generally at 8 and 10 respectively which are flexibly connected together at 12. While it is possible to mount all of the elements comprising the machine on a single carrying element such as a car or truck, it is not practical so to do because of the minimum curves present in the working chambers of the mines. The machine of the present invention, while it comprises one distinct and operative assembly, consists of units designated for convenience as a traction unit T including the truck 8 and a separator unit S including truck 10.

The truck 8 of the traction unit T includes a hollow or double wall cast body portion 13 (see Figs. 2, 5 and 9) supported by the wheel-carrying axles 14 and having a traction motor and a compressor motor, 16 and 18 respectively, mounted thereon. The axles 14 are connected by a sprocket chain 20 and the axles are driven by the traction motor 16 through a reduction gearing 22 and a drive chain 24. The compressor motor 18 drives a step-up gear 26 which operates a suction fan 27 arranged in a fan housing 28; the fan being operative to draw air from the separator unit S through a flexible conduit or hose 30 extending between and connected with the fan housing 28 and the separator unit. As shown in Fig. 5, the body portion 13 of the truck 8 is provided with a plurality of openings 32 in its upper wall and the air drawn through the hose 30 is discharged through an opening 33 into the hollow body portion of the truck to escape through the beforementioned openings 32 adjacent numerous parts mounted on the truck 8 to aid in retaining the motor or other equipment in cool condition.

The motors 16 and 18 are electrically driven and electric conductors are shown in the drawings (see Figs. 2 and 5) but inasmuch as the particular electric circuits form no specific part of the present invention these circuits are not described. The truck 8 also supports a contactor box 34, a resistor box 36 and a cable reel indicated generally at R, the construction of which will be more clearly described hereinafter. The operation of the compressor motor 18 is controlled by a switch 38 and the truck is provided with a dual controller indicated generally at 40 which controls the circuits to the motors 16 and 18.

As mentioned before, air is drawn from the separator unit through the conduit 30 and the conduit is connected to a nipple 42 having a valve therein which may be manipulated by means of the valve handle 43; the nipple 42 leading from the upper portion of the front end wall 44 of a separator box 46 mounted on the truck 10 which forms a part of the separator unit S. As clearly shown in Figs. 3 and 6, the truck 10 comprises an open frame formed of side sills 50 and end sills 52 and is supported by wheel-carrying axles 54 journaled in boxes 56 secured to the side sills (see Fig. 8). The separator box 46 is mounted on and secured to the truck in any suitable manner and is formed of metal parts or plates suitably connected together to provide a substantially leakproof receptacle comprising the end walls 44 and 58 respectively, top and bottom walls 60 and 62 respectively, and side walls 64.

The interior of the box is provided with a material receiving compartment which is generally of hopper form and comprises hopper walls 66 and 68 respectively secured at their lower edges to the upper edge portions of a trough 70 secured to the front wall 44 of the box and inclining upwardly toward the rear of the box with its end portion supported by a partition wall 72 depending from the top wall 60 of the box and connected to one of the side walls 64 and to the rear edge portion of a longitudinal baffle 74 secured to the front wall 44 and top and bottom walls 60 and 62. A portion of the trough adjacent its rear end is covered by a closure plate 76 extending transversely of the box between the baffles 74 and the opposite side wall 64 and the rear end portion of the trough is connected to a sectional tube 78 leading through the rear wall 58 of the box and provided with a flap valve 80 at its end.

Mounted in the trough and tube is a screw conveyor 82 driven by a motor 84 through a reduction gear 86, the motor and reduction gear being supported on a base 88 extended between and connected to the side sills of the truck. The motor receives its power from the traction unit T through a cable 90 and suitable motor control mechanism 92 is provided on the truck for regulating the operation of the screw conveyor.

The hopper walls 66 and 68 diverge upwardly from the trough and are secured at their upper portions to one of the side walls and the baffles 74 respectively, see Fig. 8.

Secured to the front wall 44 of the box 46, at an opening therein, is a neck 94 to which is coupled one end of a flexible hose 96, the opposite end of which latter is provided with a gatherer or funnel 98 supported in any suitable manner adjacent the cutter bar 6 to receive cuttings as they are formed. The cuttings are drawn by suction created in the box 46 by the fan 27 in housing 28 of the traction unit and are discharged into the box 46 through the neck 94, the heavier portions dropping by gravity into the trough 70 to be taken by the screw conveyor and discharged from the tube 78. Arranged within the box and adjacent the material entrance opening is a baffle 100 which serves to direct the incoming material into the trough as will be apparent, and also serves to deflect the air with the lighter portions of the material in the direction of the arrows shown clearly in Fig. 3. The lighter portions of the material comprise dust and material having substantially no sales value and is carried by the air in the material receiving compartment in the direction of the arrows indicated in Fig. 3. For causing the air to circulate as indicated in said figure, a transverse baffle 102 is provided which is arranged between the hopper walls 66 and 68 and inclines upwardly toward the front wall 44 and has its rear end portion connected to an angle-shaped member 104 secured to the closure plate 76. This baffle 102 causes the lighter particles of the material to pass with the air around the rear edge portions of the baffles 66 and 68 and then through openings 105 formed in transversely arranged plates 106 into surface contact with water 108 retained in the box 46, where the lighter portions are separated from the air and retained in the box, the air then passing out of the box through the conduit 30 back to the fan housing to be discharged into the atmosphere. The transverse partitions 106, just described, aid materially in the strength of the box 46 and one thereof extends between the baffle 74 and the trough and the other extends between the opposite side wall 64 of the box and the trough, all as clearly indicated in Fig. 8.

In use, the box 46 is adapted to hold water up to the level of a drain opening 109, see Fig. 1, and in order to clean the box 46 a bottom discharge opening 110 is provided which is normally closed by a suitable plug.

Sometimes it is advisable to dampen the material received through the hose 96 in order that the heavier portions thereof may be discharged from the box in a dampened condition and to this end spray nozzles 112 are arranged in the neck 94 and are adapted to receive water through a pipe 114 connected at its opposite end with a suitable source of supply. As shown clearly in Fig. 6, should it be desired to dampen the air as it is exhausted from the box 46, a spray nozzle 116 is provided in the box 46 which is adapted to spray the air as it passes from the box into the conduit 30, the nozzle 116 receiving water from a branch pipe 118 leading from pipe 114 and having a valve 120 therein for regulating purposes.

From the description thus far, it will be apparent that when the compressor motor 18 operates the fan 27, suction is created in the box 46 which serves to draw cuttings through the conduit 96 into the neck 94 from where the heavier particles drop into the trough to be carried out of the box by the screw conveyor when the latter is being operated by the conveyor motor. It will also be apparent that the air will follow the course of the arrows shown in Figs. 3, 6 and 8 by reason of the baffles in the hopper carrying the lighter particles of material therewith and the air will pass through the openings 105 where these lighter particles of material will impinge on the water in the box 46 to be separated from the air and retained in the box, the air then passing out of the box through the conduit 30 and through the fan housing 28 from where it is discharged into the body portion 13 of the truck 8 to escape through the openings 32.

It will also be apparent that when the spray nozzles 112 are not employed the cuttings are handled at all times in a dry state. At all times the cuttings are received from the cutter bar in a dry condition and may be discharged from the box 46 either in a dampened condition or a dry state. The drawings herein illustrate two means for handling the solid matter as it is discharged by the screw conveyor from the box 46. In Fig. 4 a conveyor of the endless belt type is shown, while in Fig. 7 a conveyor of the screw type is illustrated; the conveyors in Figs. 4 and 7 being each adapted to receive material as it is discharged from the box 46 and to convey the material either to a mine car as shown in Fig. 1 or to a suitable place of deposit in the working chamber of a mine.

Referring now to Fig. 4, the conveyor shown therein includes an endless belt 122 working in a frame 124 over rollers 126 and provided with flights 128. Supported by the truck and extending rearwardly beyond the same is a table 130 on which is pivotally mounted at 132 a conveyor support 134 to which the frame 124 is pivoted as shown at 136. The position of the frame 124 may be adjusted by chains 138 secured to the frame at ears 140 and extending to the box 46 to engage catch elements 142. Intermediate the ends of the frame and depending therefrom is a motor support 144 carrying a motor 146 which drives a reduction gear 148 having a driving connection through a chain 150 with the belt 122. The construction just described, it will be obvious, provides for delivery of the material from the box 46 to the endless belt conveyor from where it may be discharged into a mine car, as shown in Fig. 1, or to any desired place of deposit, it being apparent that because of the pivot mounting 132 the endless belt conveyor may be swung horizontally as desired and the angle of inclination of said conveyor may be varied by manipulation of the chain 138 and pivoting of the conveyor on the trunnions 136.

In Fig. 7, the stem 152 of the screw conveyor 82 extends through and projects beyond an elbow 156 arranged at the discharge end of the tube 78 and carries a driving gear 158 arranged in constant meshing relation with a gear 160 forming part of a twin idler secured to a swivel casting 162 rotatably connected to the lower end portion of the elbow 156 so as to permit rotation of the casting and the idler gear relative to the elbow. The twin idler also includes a gear portion 164 arranged in constant meshing relation with a pinion 166 mounted on a shaft 168 journaled in a bearing 170 forming a part of the rear end wall of a screw conduit 171 supported by the swivel casting 162 in any suitable manner as by bolts 173. The opposite end of the shaft 168 carries a driving pinion 172 in mesh with a gear 174 secured to one end of the stem 176 of a screw conveyor 178 arranged in the conduit 171; the stem 176 being mounted in bearings 180 formed with the end walls of the conduit 171. The conduit 171 may be of trough or tubular shape and its discharge end is provided with a flap valve 182 which is normally urged to closed position by gravity.

The machine of the present invention receives electric current from a trolley 186 in the working chamber of the mine through a cable 188 wound on a drum 190 forming part of a cable reel R mounted on the truck 8. As shown clearly in Fig. 9, the drum 190 is provided with oppositely extending hubs 192 and 194 respectively, supported in bearings 196 formed at the upper portions of supporting legs 198 secured to the truck 8.

Secured to but slidable on the hub 194 is a clutch cone 200 which is normally spring-pressed into cooperation with a clutch drum 202 rotatably mounted on the end of said hub and provided with a sprocket 204 driven by a chain 206 from the reduction gearing 22 (see Fig. 5). The hub 192 is supported in the beforementioned bearing 196 on a stationary shaft 208 which, at its inner end, supports an insulator 210 carrying stationary brushes 212 which are spring-pressed into engagement with rotary terminals 214 of a collector ring 216 supported by an insulator 218 secured to the inner surface of the drum. As clearly shown in Fig. 9, one end portion of the cable 188 extends through the drum and through an insulated bushing 220 and the individual leads of said cable are connected to the rotary terminals 214. A cable 222 extends through the stationary shaft 208 and has the individual leads thereof connected to the stationary brushes 212 and said cable 222 conveys current from the cable 188 to be distributed to the various operating mechanisms of the traction unit and to the control devices therefor.

In order to distribute the cable 188 on the drum of the cable reel R, a distributing device is provided which comprises a nut 224 rotatably mounted on a shaft 226 rotatably supported in hangers 228 supported by the resistor box, the shaft 226 being provided with right and left hand threads and being driven from the hub 194 by means of sprocket and chain driving means 230 as shown clearly in Fig. 5. The nut 224 may support an idler 232 over which the cable 188 passes and said distributor nut 224 is provided with a rearwardly extending arm 234 slidably engaged with a fixed rod 236 whereby the nut 224 is restrained against rotation on the shaft 226 during operation of the latter. In the form of the invention shown in Figs. 5 and 10, the cable 188 passes from the idler 232 around a trip pulley 238 mounted for rotation on a shaft 240 journaled at one end portion of a lever 242 pivoted on a fulcrum 244 to the supporting leg 198 for the drum, the lever being so fulcrumed as to provide short and long arms 246 and 248 respectively, the free end of the latter being connected as shown at 250 to the lower end of a link 252, the upper end of which latter is connected to a bell crank lever 254 (see Fig. 9) having a connection with the lower end portion of a clutch band 256 secured to the clutch cone 200 and adapted to be operated to release the engagement of said clutch cone with the clutch drum 202. The shaft 240, at its opposite end, is supported by an arm 243 pivoted to the opposite supporting leg 198, as clearly shown in Figs. 1, 2 and 5. The clutch cone, as before described, is spring-pressed into cooperation with the clutch drum 202. If, during winding of the cable on the drum 190, the tension of the cable increases to a point in excess of the tension of the spring which retains the clutch cone and clutch drum in engagement, it is apparent that the cable tension will actuate the lever 242 on its fulcrum 244 to cause the link 252 to actuate the bell crank lever and react on the clutch band 256 to release the clutch whereupon the clutch cone may rotate freely on the hub 194 until such time as the tension on the cable is released to permit the pulley 238 to drop to normal position and re-engage the clutch cone and clutch drum. Manual means are provided for actuating the clutch and, as shown clearly in Figs. 5 and 10, the end portion of the long arm 248 of lever 242 is connected by means of a link 258 with a bell crank lever 260 pivoted to a bracket 262 carried by the resistor box and adapted to be actuated on its pivot by a handle 264. Obviously, movement of the lever to actuate the bell crank 260 causes a movement of the lever 242 on its fulcrum to release the clutch cone and clutch drum. The handle 264 is provided with a catch element 266 and works through a guide 268, and operation of the handle 264 to cause engagement of the catch element 266 with the guide 268 will retain the clutch elements in disengaged relation until such time as the handle 264 is released.

In the form of the invention shown in Fig. 11 the free end of the long arm 248 of lever 242 supports the threaded shaft 226 on which the distributor nut is mounted for movement. The shaft 226 is adapted to be driven by sprocket and chain connections similar to that shown in Fig. 5 and the cable 188 passes round the idler mounted on the distributor nut before being wound on the drum, the shaft 226 having bearing in arms 270 supported from the hubs 192 and 194. The distributor nut is provided with an extension 272 which is slidably engaged with a rod 274 mounted and supported by the extreme end portions of the arms 270. If desired, an idler 276 is mounted on the rod 274 for an obvious purpose.

From the above description it is believed that those skilled in the art will recognize that the present invention discloses a machine which is operative to cause a withdrawal of cuttings in a mine at the time they are formed and from the place of formation to a separator box wherein the heavier portions fall by gravity to a conveying means adapted to remove these heavier portions from the separator box and to convey them to a place of deposit while the lighter portions of the cuttings which are trapped by the air are caused to impinge on water whereby they are separated from the air, and the air is passed out of the separator box in substantially clean condition, thus preventing the distribution of dust throughout the working chamber of a mine. It is also apparent that the cuttings are handled in a dry state from the time of formation until they enter the separator box and that, if necessary, the heavier portions thereof may be dampened by water sprayed into the incoming air so that the heavier portions upon removal from the separator box are damp to thus prevent escape of dust particles which may adhere thereto into the working chamber of the mine.

The present invention contemplates a new and improved assembly of elements which cooperate to form a device for handling mine cuttings in a most expeditious and clean manner.

It will be apparent to those skilled in the art that the machine of the present invention is so constructed as to permit a continuous feeding of the material to the distributor box by suction and a discharge of the material from the box. As shown clearly in Fig. 3 the screw conveyor is arranged within a housing, the upper end of which forms substantially a tube and the discharge end thereof is provided with a flap valve which is adapted to close by gravity. Due to this particular arrangement, the sucking force of the air is concentrated on the intake hose 96 because the partial vacuum created in the box tends to maintain the valve 80 in closed position. When the screw conveyor housing is full of solid material which is being forced through the discharge opening it will be apparent that this solid material forms a seal against intake of air through the conveyor or conveyor housing. In the particular instance shown in Fig. 3 the flap valve 80 is hinged to a plate 81 at 83 at a point below the uppermost point of the element 78 so that a portion of the discharge opening or the upper, discharge end of the screw conveyor remains permanently closed. This provides an arrangement in which, if the screw conveyor is only partly full of material, the material in cooperation with the hinge plate 81 forms a seal against intake of outside air to the conveyor housing.

The drawings herein illustrate one embodiment of the invention together with certain specific constructions incident thereto, but it is to be understood that they are for illustrative purposes only and various changes in the form and preparation of the construction may be made within the scope of the appended claims without departing from the spirit of the invention. The drawings also disclose devices operated electrically and while cables and conductors are shown for operating these mechanisms, the drawings do not show complete electric circuits for the reason that the particular electric circuits form no part of the present invention, it being understood that the several mechanisms such as motors, contactor box, resistor box, dual controller and the operating control means for the compressor motor and conveyor motor are to be connected in proper operative circuits.

What is claimed is:

1. In a pneumatic machine for handling mine cuttings, feeding means adapted to receive cuttings in a dry state as they are formed, suction means for drawing the cuttings through the feeding means, a separator box into which said cuttings are delivered, means for dampening said cuttings as they are delivered to said separator box, means receiving the heavier portions of the cuttings and discharging them from the box, and means for separating the lighter portions of the cuttings from the air.

2. In a separator of the type described, a separator box holding water at a predetermined level, a material receiving compartment in the box, an inclined trough conveyor in said compartment having a restricted discharge outside said separator box, a material intake in said box, baffles for deflecting the heavier material into said trough, a discharge port for the lighter material, and means for deflecting the lighter materials into contact with said water after deposit of the heavier material into the trough.

3. In a separator of the kind described, a separator box holding water, a material receiving compartment in the box and formed to include an inclined trough having a discharge opening outside the box, a screw conveyor in said trough, a normally closed valve for said discharge opening, a feeding pipe discharging into said receiving compartment, a discharge pipe, suction means for exhausting air from the feeding pipe into the material receiving compartment, baffles to deflect heavier material directly from the feed pipe to the trough, and means exterior the material receiving compartment for directing the lighter material into contact with the water in said separator box.

4. In a separator of the kind described, a separator box, a material receiving compartment in the separator box including an inclined trough, a conveyor in said trough discharging through a port outside of the box, a valve for normally closing said discharge port, a feed pipe opening into the material receiving compartment, deflectors for directing portions of the material from the feed pipe into said conveyor suction means for exhausting air from the feed pipe into the material receiving compartment, means for deflecting the air from the feed pipe through a separator outside of the material receiving compartment and means for sealing the conveyor discharge port during the opening of the valve.

RANDALL W. SHULTZ.
HERBERT A. STEVENS.